United States Patent [19]

Kleinhans

[11] Patent Number: 4,500,200
[45] Date of Patent: Feb. 19, 1985

[54] ELECTRO-OPTIC SENSOR FOR MEASURING ANGULAR ORIENTATION

[75] Inventor: William A. Kleinhans, Santa Ana, Calif.

[73] Assignee: Rockwell International Corporation, El Segundo, Calif.

[21] Appl. No.: 401,758

[22] Filed: Jul. 26, 1982

Related U.S. Application Data

[63] Continuation-in-part of Ser. No. 206,744, Nov. 14, 1980, abandoned.

[51] Int. Cl.³ .......................... G01B 11/26; G01C 1/00
[52] U.S. Cl. ..................................... 356/152; 350/433; 350/446; 356/141
[58] Field of Search ................. 350/433, 446; 356/141, 356/152

[56] References Cited

U.S. PATENT DOCUMENTS

| | | | |
|---|---|---|---|
| 1,947,566 | 2/1934 | Maurer, Jr. | 350/433 |
| 1,947,567 | 2/1934 | Maurer, Jr. | 350/433 |
| 2,700,318 | 1/1955 | Snyder . | |
| 3,486,826 | 12/1969 | Colvin et al. | 356/141 |
| 3,703,682 | 11/1972 | Wickman et al. | 356/152 |
| 3,858,201 | 12/1974 | Foster . | |
| 3,918,814 | 11/1975 | Weiser | 356/152 |
| 3,951,550 | 4/1976 | Slick | 356/141 |
| 4,097,750 | 6/1978 | Lewis et al. | 250/548 |
| 4,136,568 | 1/1979 | Seymour | 73/655 |
| 4,168,524 | 9/1979 | Soltz et al. | 364/456 |
| 4,193,689 | 3/1980 | Reymond et al. | 356/152 |
| 4,203,652 | 5/1980 | Hanada | 350/433 |
| 4,209,254 | 6/1980 | Reymond et al. | 356/152 |
| 4,211,922 | 7/1980 | Vaerewyck et al. | 250/203 R |

*Primary Examiner*—S. C. Buczinski
*Attorney, Agent, or Firm*—Gilbert H. Friedman; H. Fredrick Hamann

[57] ABSTRACT

An electro-optic sensor for precise, direct and continuous measurement of the angular displacement between two bodies. A linear array of photodetectors is disposed on a planar surface mounted on the first body parallel to the axis about which the displacement is to be measured. The line of the array is perpendicular to this axis. A light source disposed on the planar surface near the photodetector array transmits light through optics to a reflecting reference flat mounted on the second body. The optics collimates the transmitted light and causes the reflected image of the light source to be spread into a line on and perpendicular to the photodetector array. This line image moves along the linear array as angular displacement occurs between the two bodies. No mechanical moving parts are required in the sensor.

7 Claims, 4 Drawing Figures

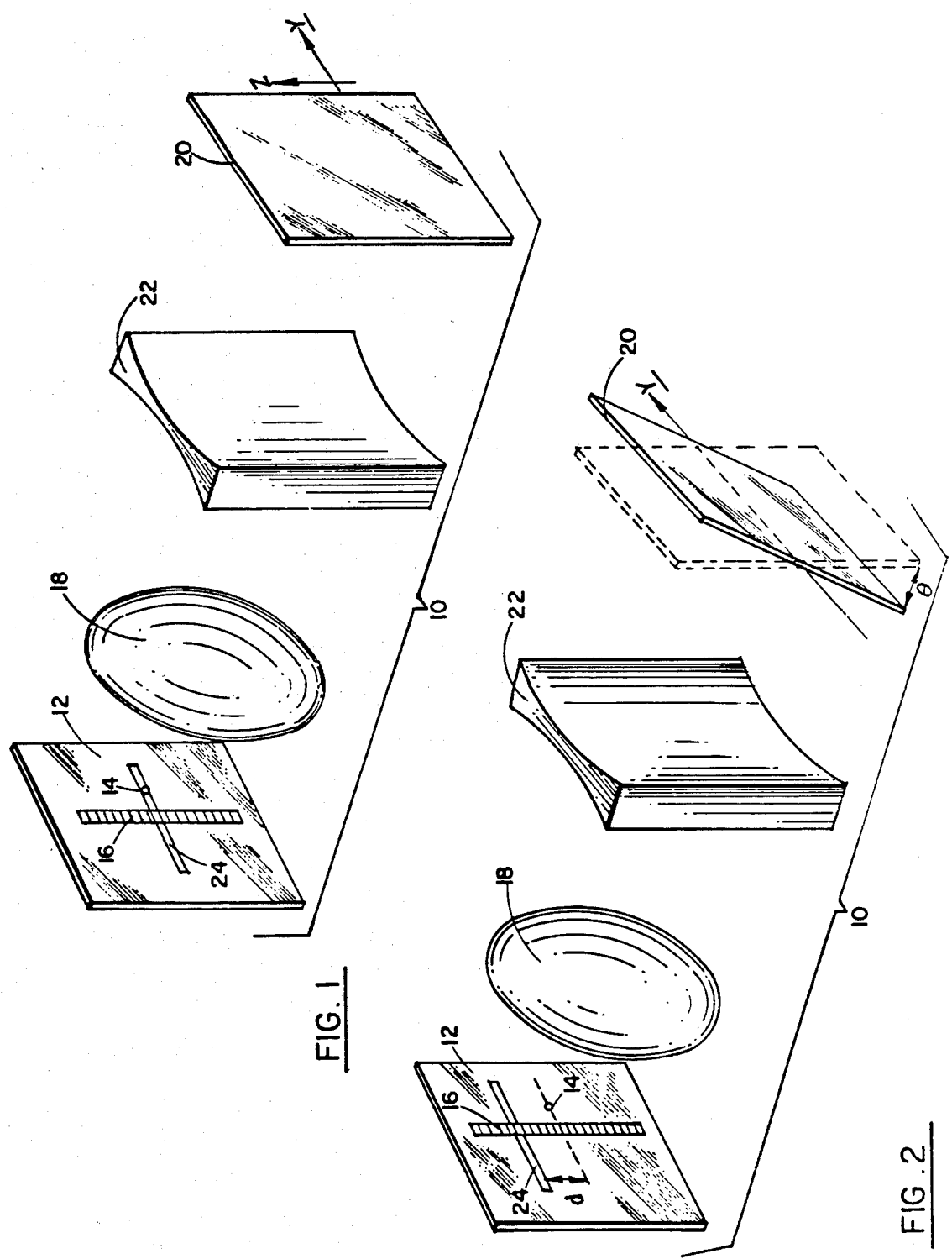

ELECTRO-OPTIC SENSOR FOR MEASURING ANGULAR ORIENTATION

CROSS-REFERENCE TO RELATED APPLICATIONS

This application is a continuation-in-part of U.S. patent application Ser. No. 206,744, filed Nov. 14, 1980, now abandoned.

BACKGROUND OF THE INVENTION

This invention relates to angular orientation indicators and has particular reference to optical devices therefor.

In providing inertial navigation instruments for shipborne navigation systems, a need arises to isolate the inertial measurement unit (IMU) of a system from the ship structure in order to avoid the effects of structure-transmitted shock on the operation of the system. In a recently adopted design, a shockmount provides isolation of the IMU from the ship structure by a six-degree-of-freedom, low-frequency, elastomeric suspension which allows the IMU compliance in both rotation and translation. This suspension concept enables an elegantly simple mechanical suspension design to be used which is much lower in cost and which provides better isolation of the IMU from angular acceleration than does the use of conventional, irrotational ("hard") shockmounts.

In order to use this shockmount concept, it is necessary to maintain precise and continuous measurement of the attitude or angular orientation of the IMU relative to a ship-fixed reference frame so that the ship's roll, pitch and heading can be determined. These are typically required system outputs. Thus, a need arises for apparatus to provide an accurate, direct and continuous measurement of the IMU attitude relative to the ship.

A tracking autocollimator could be used for this purpose. Such a device uses a mirror mounted for rotation on a two-axis gimbal. However, such an approach has the disadvantage of requiring the use of mechanical moving parts in the gimbal structure. As is well known, the use of such mechanical moving parts is to be avoided, where possible, since they decrease the reliability of a device while increasing its complexity and cost.

SUMMARY OF THE INVENTION

An object of the present invention is the provision of precise, direct and continuous measurements of the attitude or angular orientation of a body relative to some reference frame such as, for example, an IMU relative to a ship-fixed reference frame as discussed above.

Another object of the invention is the provision measurements of the angular displacement of a body using a device which has no mechanical moving parts.

According to the present invention, the foregoing and other objects are attained by an electro-optical readout system having a sensor array of photodetectors disposed along a straight line on a planar surface. The planar surface is maintained substantially parallel to a selected axis about which it is desired to measure angular displacement due to rotation. The line of the sensor array is substantially perpendicular to the selected axis. A source of light is disposed on the planar surface close to the array but spaced apart therefrom. Optical means are provided to receive light from the source and to collimate it for transmission to a reflecting reference flat. The planar surface and the sensor array of photodetectors are in the focal plane of the optical means. The optical means, the light source and the planar surface having the sensor array thereon are assembled and mounted in fixed relationship to each other. The light striking the reference flat is reflected back through the optics into an image of the light source on the photodetector array. The position of the image on the array relative to a reference point, is a measure of the angular displacement between the reference flat and the planar surface about the selected axis.

In the preferred embodiment of the invention, the optics is designed to spread the image of the light source into a line extending substantially perpendicular to the line of the sensor array. In this case, the optics is formed to collimate the light transmitted to the reference flat in a first direction parallel to the line of the sensor array and to cause the light to diverge in a second direction orthogonal to the first direction and thus orthogonal to the sensor array of photodetectors.

The deployment of the major parts of an electro-optical sensor in accord with the invention is flexible in that the assembly of optics, photodetector array and light source may be mounted either on a first body or base which may be regarded as having a reference orientation or on another body rotatable relative to the first body. Whichever of the two bodies carries the assembly, the other body will carry the reference flat.

BRIEF DESCRIPTION OF THE DRAWINGS

FIG. 1 is a view in perspective of an electro-optic orientation sensor in accord with the invention.

FIG. 2 shows the effect of rotation on the sensor of FIG. 1.

DESCRIPTION OF THE PREFERRED EMBODIMENTS

Figure 3:
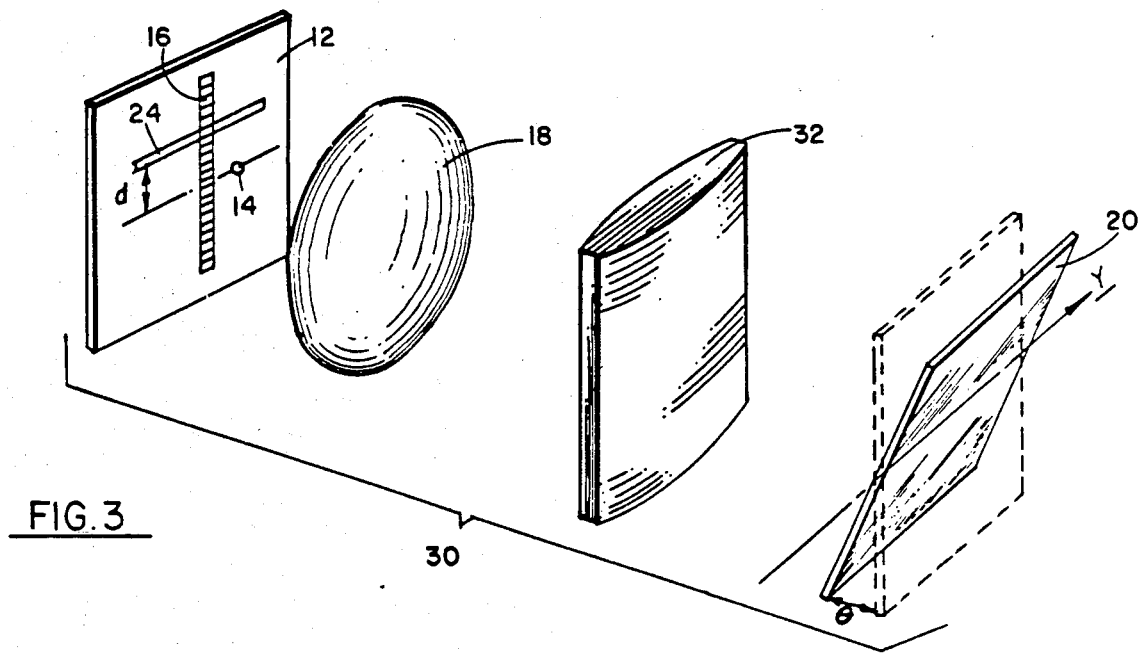
FIG. 3 is a view in perspective of an alternative embodiment of the sensor.

Referring now to FIG. 1, there is shown an electro-optic sensor 10 in accord with the invention. On a planar surface 12, a light source 14 is disposed adjacent to a linear array of photodetectors 16.

The light source 14 may be a light-emitting diode (LED) wherein the light is in the infra-red range. Plessey Telecommunications of Liverpool, England, makes a gallium arsenide infra-red emitter for fiber optic transmission links which is also useful as the light source 14 for this sensor.

The linear array of photodetectors 16 may be, for example, a photodiode array such as the Reticon RL–1024G solid state line scanner built by EG&G Reticon of Sunnyvale, Calif., for various commercial applications such as optical character recognition, pattern recognition and facsimile.

The planar surface 12 is at the focal plane of a collimating lens 18. Collimating lens 18 receives light from the LED 14 and transmits it to a reflecting reference flat 20.

Given that the electro-optic sensor 10 is to measure the orientation or attitude of a certain body rotatable with respect to a base, the planar surface 12 may be mounted on the rotatable body. In this case, the reference flat 20 will be mounted on the base. Conversely, if the planar surface 12 is fixed to the base, the reference flat 20 will be mounted on the rotatable body. Whichever of these two alternatives is chosen, the planar surface 12 and the reference flat 20 are so mounted that they are substantially parallel to each other when the rotatable body is at a reference attitude relative to the base.

The electro-optic sensor 10 is a single-axis sensor in that it is well adapted to measure angular displacement about only one selected axis. The selected axis is parallel to the planar surface 12, parallel to the reference flat 20 and perpendicular to the line of the photodiode array 16. Note the set of coordinate axes drawn near reference flat 20 in FIG. 1. The selected axis for the sensor 10 is the Y axis of these coordinates.

The light source 14 is disposed adjacent to the photodiode array 16. That photodiode in the array 16 which is closest to the light source 14 will typically be selected to be reference sensor element which, when energized by light reflected from the reference flat 20, indicates alignment of the rotatable body to its reference attitude.

In the situation where the reference flat 20 is precisely parallel to the planar surface 12, and where collimating optics only is interposed between the light source 14 and the reference flat 20, light reflected from the reference flat 20 would be focused into an image of the light source 14 at the light source 14 rather than on the photodiode array 16. This is undesirable since there would be no useful output of the sensor 10 in this case. However, it will be apparent to those skilled in the art that the spot image of the light source 14 can be focussed on the photodiode array 16 by introducing a bias rotation of the reference flat 20 relative to the planar surface 12, or vice versa, about the Z axis. In fact, in a single axis system, a bias could be maintained on the Z axis to insure that the spot image of the light source 14 falls on the photodiode array 16 for any angular displacement of the reference flat 20 relative to the planar surface 12 about the Y axis. However, such an arrangement is unlikely to be desirable since the operation of the sensor 10 would then be unduly dependent on a fixed orientation about the Z axis. It is for this reason that a diverging lens 22 is interposed between the collimating lens 18 and the reference flat 20 in the sensor 10 of FIG. 1. Diverging lens 22 causes light transmitted through it from the light source 14 to diverge in a direction perpendicular to the line of the photodiode array 14. The image 24 of the light source 14 which is reflected back onto the planar surface 12 and photodiode array 16 is thus spread into a line extending substantially perpendicular to the line of the photodiode array 16. This compensates for the displacement of the light source 14 from the array line and also makes the sensor 10 insensitive to rotation about the Z axis.

In an experimental assembly of a sensor 10 in accord with the invention built to test its performance, the distance from the diverging lens 22 to the reference flat 20 was about seven inches. The diverging lens 22 was a 60 mm by 50 mm negative cylinder lens having a minus 145 mm focal length. The collimating lens 18 was a 40 mm diameter rotationally symmetric lens having a 160 mm focal length. The reflecting reference flat 20 was a 3-inch diameter mirror coated with gold to obtain high reflectance in the infra-red band of light wavelengths. Internal reflections in the spherical collimating lens 18 were reduced by forming anti-reflection coatings on the lens' surface and by adjusting its position.

Referring now to FIG. 2, the sensor 10 of FIG. 1 is seen as having experienced an angular displacement of the reference flat 20 about the Y axis. The reflected line image 24 is thus raised a distance above the reference diode element on the photodiode array 16. Scanning of the photodiode array 16 by suitable electronic circuitry detects the particular photodiode illuminated by this displacement of the line image 24.

The light source 14 is preferably pulsed to obtain high intensity light and therefore high sensitivity of the sensor 10, while keeping the average power dissipated in the source 14 low. The pulsing may be synchronized by the same circuitry used to scan the photodiode array 16.

It is seen that rotation of the reference flat 20 relative to the planar surface 12, or vice versa, about an axis parallel to the line image 24 causes the line image 24 to move along the linear photodiode array 16. Thus an individual illuminated photodiode provides a measure of the angular displacement about this axis (in this case, the Y axis). This input axis is normal to the line of sight of the sensor 10 and also normal to the axis of the negative cylinder lens 22. The long axis or array line of the photo-detector 16 is parallel to the axis of the cylinder lens 22. If rotation about the line of sight occurs, nothing changes. Hence the electro-optic sensor 10 is insensitive to such rotation. Also, if rotation occurs about an axis parallel to the negative cylinder lens axis (in this case, the Z axis), the line image 24 moves along itself and the same photodiode on the photodiode array 16 remains illuminated. Thus the sensor 10 is insensitive to rotations about these latter two axes. The sensor 10 is also insensitive to linear motions, which only affect the intensity of the returned line image 24.

In cases where the location of the reference flat 20 relative to the lenses is well established, greater sensitivity may be obtained if the negative cylinder diverging lens 22 of FIGS. 1 and 2 is replaced by a positive cylinder diverging lens 32 as shown in the electro-optic sensor 30 of FIG. 3. The axis of the lens 32 is parallel to the line of the array 16. The greater sensitivity is achieved with the positive cylinder diverging lens 32 because relatively more of the light energy is collected from the reference flat 20 and returned to the light image 24. Thus, the intensity of light at the photodiode array 16 is increased. For proper operation, the reference flat 20 must be displaced from the focal point of the lens 32 by at least about twenty percent of the focal length thereof. This is because the positive cylinder lens 32 produces no divergence at its focal point.

In applications of this invention such as the one discussed above, angular displacements are limited to fairly small angles. In such applications, the diverging lens 22 or 32 need not have a particularly large power or diverging effect. The diverging effect may be limited to be no more than is necessary to maintain the line image 24 in registration with the photodiode array 16 for the limited angular displacement about the Z axis.

Limiting the diverging effect of the cylinder lens 22 or 32 and thus limiting the length of the line image 24 has several advantages. First, the resulting intensity of the light at the photodetector is greater than it would be for a longer line image 24. In addition, it is relatively easier and less costly to provide cylinder lenses with low distortion when the lens is required to have only relatively low power.

It should be noted that neither of diverging lenses 22 and 32 is required to focus. All of the focussing necessary is provided by the rotationally symmetric collimating lens 18 in the embodiments of FIG.'s. 1, 2 and 3. Inasmuch as rotationally symmetric lenses are relatively much easier and less costly to fabricate with high power and low distortion, a collimiating lens 18 capable of providing very high resolution can be readily procured for use in this invention. Thus, due to the high resolution available in the collimating lens 18, it is appropriate to use a photodetector array 16 having a similarly high resolution in the embodiments of FIG.'s. 1, 2 and 3.

Figure 4:
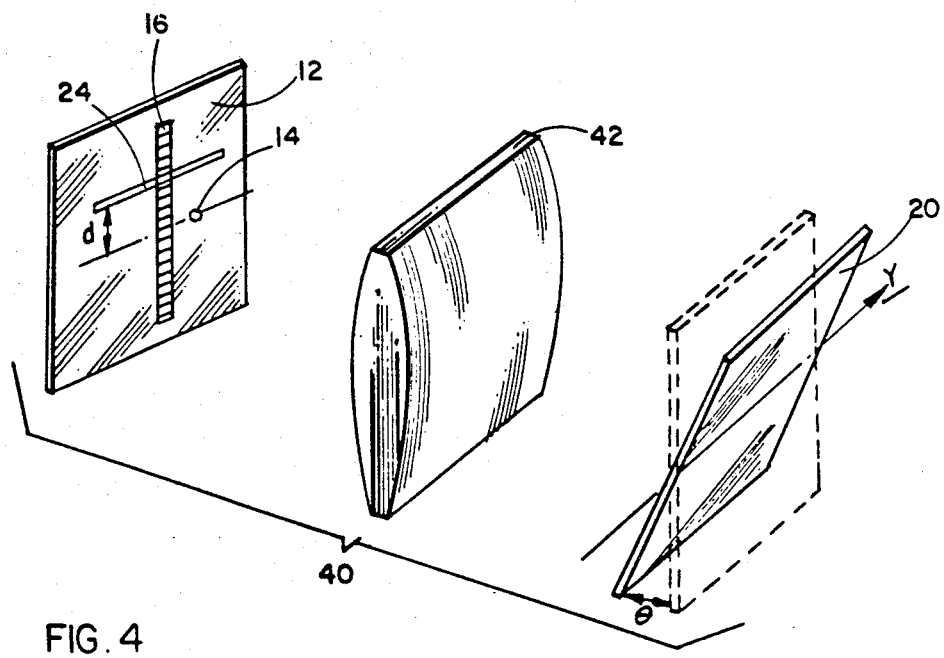
FIG. 4 shows a view in perspective of yet another alternative embodiment of a sensor in accord with the invention.

If the power of the cylinder lens 22 in FIGS. 1 and 2 is chosen to be equal to minus the power of the collimating optics 18, the first-order properties of these two lenses may be merged into a single positive cylinder lens 42 as shown in the electro-optic sensor 40 of FIG. 4. In this embodiment, cylinder lens 42 has its axis perpendicular to the line of the array of photodetectors 16. With this arrangement, the number of optical elements required is reduced. Planar surface 12 is at the focal plane of the lens 42.

By attempting to measure rotation about a single axis only, the electro-optic sensors 10, 30 and 40 of FIGS. 1-4 can use a linear photodiode array 16 rather than a two-dimensional array. Linear photodetector arrays have much better resolution than two-dimensional arrays. Furthermore, since a line image only is required, the sensors 10, 30 and 40 are not degraded by optical astigmatism. Thus, quite simple optics are typically adequate to practice the invention.

Where, as in the case of the IMU suspended for shipboard navigation discussed above, it is desired to measure the overall angular displacement of a body about a set of three orthogonal coordinate axes, three individual electro-optic sensors 10, 30 or 40, each as shown in FIGS. 1 and 2 or 3 or 4, are mounted so as to form an orthogonal triad.

The lenses shown in FIGS. 1-4 appear as single-element lenses. As will be apparent to those skilled in the art, however, compound lenses may be used, were appropriate, to meet performance requirements.

There have been described preferred embodiments of the invention. However, it will be apparent to those skilled in the art that embodiments other than those which have been expressly described are possible and that these other embodiments will fall within the spirit and scope of this invention as set forth in the following claims.

What is claimed is:

1. Apparatus for measuring angular displacement about a selected axis, comprising:

an array of photodetectors disposed along a line on a planar surface, wherein said planar surface is maintained substantially parallel to an axis plane containing said selected axis and a second axis orthogonal to said selected axis, and wherein said array line is substantially perpendicular to said selected axis;

a source of light disposed on said planar surface adjacent to a selected point on said array line;

optical means for transmitting light received from said source, wherein said transmitted light is collimated by said optical means, wherein said planar surface is at the focal plane of said optical means and wherein said optical means, said light source and said planar surface are mounted in fixed relationship to each other;

a reflecting reference flat mounted a, for receiving said transmitted light and for reflecting it back through said optical means and into an image of said source on said photodetector array, wherein the linear displacement along said array line of said image, relative to the position of said selected point, is a measure of the angular displacement about said selected axis between said flat and said planar surface; and wherein said optical means includes means for spreading said image into a line image extending substantially perpendicular to said array line, said image spreading means having no more than about enough diverging effect than is necessary to maintain said line image in registration with said array of photodetectors for limited angular displacement about said second axis.

2. The apparatus recited in claim 1 wherein said optical means includes a cylinder lens.

3. The apparatus recited in claim 2, wherein said cylinder lens is a negative cylinder lens and wherein the axis of said negative cylinder lens is substantially parallel to said array line.

4. The apparatus recited in claim 2, wherein said cylinder lens is a positive cylinder lens, wherein the axis of said cylinder lens is substantially parallel to said array line and wherein said reference flat is displaced from the focal point of said cylinder lens by at least about twenty percent of the focal length thereof.

5. The apparatus recited in claim 2, wherein said optical means consists of a single positive cylinder lens having its axis substantially perpendicular to said array line combining the properties of collimating optics with the properties of cylinder optics to spread said image into a line extending substantially perpendicular to said array line.

6. The apparatus recited in claims 1, 2, 3, 4 or 5, wherein said reflecting reference flat is mounted on a base and wherein said array of photodetectors, said light source and said optical means are fixed to a body mounted for rotation relative to said base.

7. The apparatus recited in claims 1, 2, 3, 4 or 5, wherein said array of photodetectors, said light source and said optical means are mounted on a base and wherein said reference flat is fixed to a body mounted for rotation relative to said base.

* * * * *

UNITED STATES PATENT AND TRADEMARK OFFICE
CERTIFICATE OF CORRECTION

PATENT NO. : 4,500,200
DATED : February 19, 1985
INVENTOR(S) : William A. Kleinhans It is certified that error appears in the above-identified patent and that said Letters Patent are hereby corrected as shown below:

Claim 1 (Amended) Apparatus for measuring angular displacement about a selected axis, comprising:
    an array of photodetectors disposed along a line on a planar surface, wherein said planar surface is maintained substantially parallel to an axis plane containing said selected axis and a second axis orthogonal to said selected axis, and wherein said array line is substantially perpendicular to said selected axis;
    a source of light disposed on said planar surface adjacent to a selected point on said array line;
    optical means for transmitting light received from said source, wherein said transmitted light is collimated by said optical means, wherein said planar surface is at the focal plane of said optical means and wherein said optical means, said light source and said planar surface are mounted in fixed relationship to each other;
    a reflecting reference flat mounted [a] <u>substantially parallel to said planar surface</u> for receiving said transmitted light and for reflecting it back through said optical means and into an image of said source on said photodetector array, wherein the linear displacement along said array line of said image, relative to the position of said selected point, is a measure of the angular displacement about said selected axis between said flat and said planar surface; and

UNITED STATES PATENT AND TRADEMARK OFFICE
CERTIFICATE OF CORRECTION

PATENT NO. : 4,500,200

DATED : February 19, 1985

INVENTOR(S) : William A. Kleinhans

Page 2 of 2

It is certified that error appears in the above-identified patent and that said Letters Patent are hereby corrected as shown below:

wherein said optical means includes means for spreading said image into a line image extending substantially perpendicular to said array line, said image spreading means having no more than about enough diverging effect than is necessary to maintain said line image in registration with said array of photodetectors for limited angular displacement about said second axis.

Signed and Sealed this

Twenty-ninth Day of April 1986

[SEAL]

Attest:

*Attesting Officer*

DONALD J. QUIGG

*Commissioner of Patents and Trademarks*